Aug. 24, 1943.  R. W. WILLIAMS  2,327,837
GASKET
Filed April 6, 1942
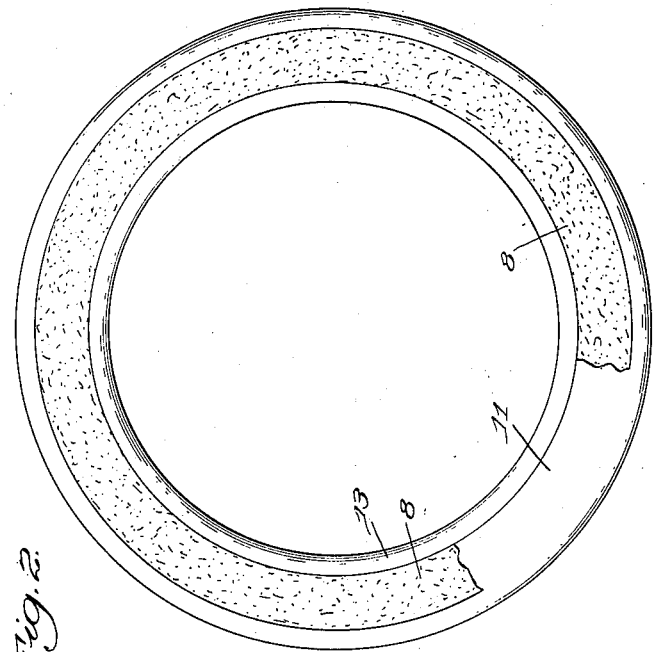
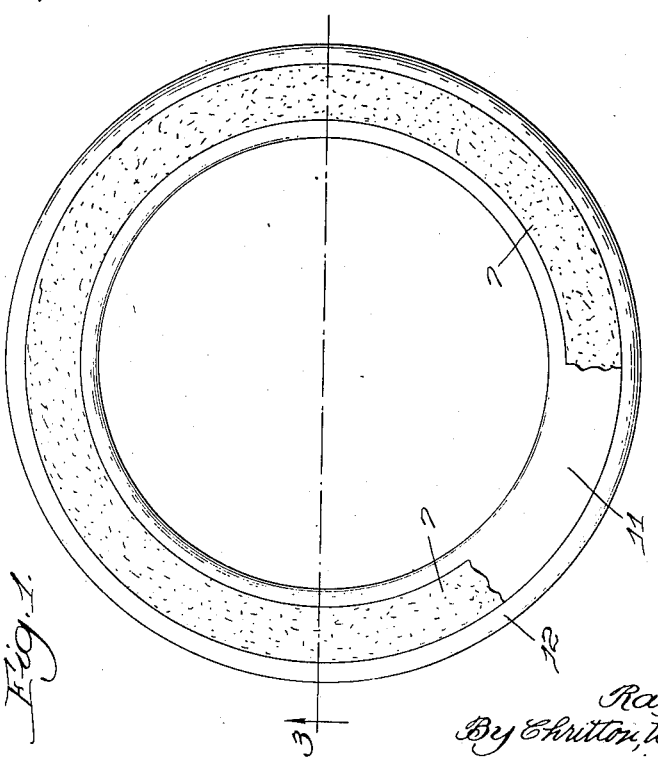
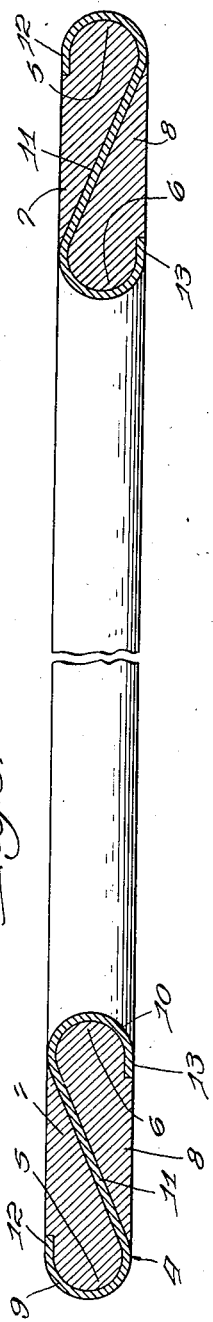
Inventor:
Ray W. Williams.
By Chritton, Wiles, Davis & Hirsch.
Attys.

Patented Aug. 24, 1943

2,327,837

UNITED STATES PATENT OFFICE 2,327,837

GASKET

Ray W. Williams, Blue Island, Ill., assignor to United Conveyor Corporation, a corporation of Illinois Application April 6, 1942, Serial No. 437,817

1 Claim. (Cl. 288—26)

My invention relates generally to gaskets and the casings provided as elements thereof and in which the packing material of the gaskets is confined.

My invention was devised for use more particularly, though not to its exclusion for other uses, in connection with the manufacture of gaskets to be used as the sealing means at the joints between the pipe sections of pneumatic conveyor pipes, used more especially for the conveying of ash.

The sealing of such joints has presented special problems: When the ash is to be handled the conveyor pipe, usually formed of pipe-sections, is subject to high temperatures and to excessive abrasion and because of this the pipe sections are cast of an alloy so hard that it is impracticable to machine the flanges of the pipe sections and therefore the flanges are not perfectly true.

Such conditions therefore require that a satisfactory gasket be capable of withstanding high temperatures and be sufficiently compressible to compensate for any lack of alignment, or non-uniformity of surface or unevenness, of the flanges and still not be so soft that it will thin out in use under the forces exerted in the expanding of the pipe and require repeated tightening of the gasket; and furthermore so retain the packing material as to prevent the squeezing thereof radially inwardly or outwardly of the joint.

It is therefore one of my objects to provide a gasket which will meet the reqirements of a satisfactory gasket as above set forth.

Another object is to provide a gasket the packing material of which is soft and readily conformable, in the installing of the gasket in a joint, to surface irregularities of the end surfaces of the pipe sections and to non-alinement of the pipe sections, but which afterwards becomes set and unyielding to produce a tight unyielding joint.

Another object is to provide a gasket-casing which shall be of simple construction and inexpensive of manufacture and will serve to perform, to a high degree of satisfaction, the functions for which such articles are provided, and other objects as will be understood from the following description.

Referring to the accompanying drawing:

Figure 1 is a plan view of one side of a gasket constructed in accordance with my invention, a portion of the packing at this side of the gasket being broken away.

Figure 2 is a similar view of the opposite side of the gasket, a portion of the packing at this side of the gasket being broken away; and Figure 3, an enlarged broken sectional view of the gasket, the section being taken at the line 3 on Fig. 1 and viewed in the direction of the arrow.

The gasket shown comprises a casing 4 in the form of a ring shaped to afford annular recesses 5 and 6 at its opposite faces for receiving packing material represented at 7 and 8 to seal the joint in which the gasket is to be used, it being understood that the gasket would be inserted, and clamped, between the opposing ends of the pipe sections to be assembled together.

The casing 4, which may be made from a single sheet of material, such as for example, a mild steel sheet, to produce a one-piece structure, is of general S-shape in cross section as shown, the inner and outer peripheral edges of the annular blank from which the casing is made being bent inwardly and outwardly, respectively, as shown at 9 and 10, and its intermediate portion or web 11 bent to extend angularly with relation to the plane of the casing preferably substantially throughout the height of the casing as shown to produce the annular recesses 5 and 6, the marginal edges 12 and 13 of the peripheral portions 9 and 10 preferably being flat as represented.

The packing material 7 and 8 may be of any suitable kind. Preferably, and in accordance with one feature of my invention, it is any desirable material which may be filled, in soft plastic condition, into the recesses 5 and 6, remaining in plastic condition in the assembling of the gasket with the pipe sections and later set into rigid condition. By way of example, such a material may be composed of one-third dry Portland cement, two-thirds powdered asbestos, both materials measured by volume, and water of an amount sufficient to produce a pliable putty, the cement and asbestos being first mixed together and the mixture thus produced mixed with the water.

The casing holds the packing material 7 and 8 in position at the opposite faces of the casing 4 against squeezing radially inwardly or outwardly beyond the casing not only under the force exerted against it by the weight of superposed pipe sections, as in the case of a vertical pipe, but also in the clamping of the gasket in the pipe joint, and prevents displacement of the packing, in plastic condition, from the casing not only in the charging of the packing material into the casing recesses, but also in the handling of the gasket to the point of assembly with the pipe sections.

The material of the casing 4 is preferably stiff enough to support the weight of the pipe sections superposing it when the pipe extends vertically, but is sufficiently thin to permit the casing to deform and compensate for lack of alignment of the pipe flanges, when force, as for example by means of bolts applied to the pipe flanges as commonly provided, is applied to clamp the gasket in place.

It will be noted that where the packing material used has the characteristics above stated, the joint produced is of non-yielding character, with the packing, in rigid non-yielding condition, conformingly fitting the opposed end surfaces of the pipe sections regardless of irregularities and non-alignment of such surfaces, thereby producing a permanent rigid, tight joint, the gasket being held securely in place by the clamping means on the pipe sections.

While I have illustrated and described a particular embodiment of my invention I do not wish to be understood as intending to limit it thereto, as the same may be variously modified and altered and embodied in other forms of structure without departing from the spirit of my invention.

What I claim as new, and desire to secure by Letters Patent, is:

In a gasket-casing, a one piece annular body comprising inner and outer rounded edges formed as inwardly open substantially semi-cylindrical cross-sectioned portions joined by an annular frusto-conical portion integral and tangential at its inner and outer edges with alternate edges of said edge portions, whereby to provide opposite, complemental wedge-shaped recesses, the opening thereof forming substantially the whole of said opposite faces.

RAY W. WILLIAMS.